United States Patent [19]

Ludwig

[11] Patent Number: 4,854,554

[45] Date of Patent: Aug. 8, 1989

[54] PNEUMATIC SPRING STRUCTURE WITH DIAL OUTPUT FORCE AND PRESSURE DECAY COMPENSATION AND METHOD OF OPERATION

[75] Inventor: George C. Ludwig, Marion, S.C.

[73] Assignee: Maremont Corporation, Carol Stream, Ill.

[21] Appl. No.: 246,682

[22] Filed: Sep. 20, 1988

Related U.S. Application Data

[62] Division of Ser. No. 946,203, Dec. 19, 1986, Pat. No. 4,788,747.

[51] Int. Cl.⁴ .............................. F16F 5/00; F16F 9/43; E05F 3/00; F16J 15/40
[52] U.S. Cl. ...................................... 267/64.11; 16/66; 267/64.28; 277/3; 277/70
[58] Field of Search .............. 267/64.11, 64.13, 64.25, 267/64.28, 120, 124; 296/56, 57 A; 16/66, 68, 82, 84, DIG. 17; 188/269, 281, 282, 332.18, 332.21; 277/3, 70, 71, 73; 92/82, 168 R

[56] References Cited

U.S. PATENT DOCUMENTS

| | | | |
|---|---|---|---|
| 1,888,578 | 11/1932 | Wallace | 267/64.26 |
| 3,056,598 | 10/1962 | Conway et al. | 267/64.26 |
| 3,444,830 | 5/1969 | Doetsch | 267/64.28 X |
| 4,268,018 | 5/1981 | Langanke | 267/120 |
| 4,408,751 | 10/1983 | Dodson et al. | 188/277 X |
| 4,446,895 | 5/1984 | Kato | 188/322.21 X |
| 4,570,912 | 2/1986 | Dodson et al. | 267/64.15 |

FOREIGN PATENT DOCUMENTS 2015121 9/1979 United Kingdom ........... 188/322.21

*Primary Examiner*—Robert J. Oberleitner
*Attorney, Agent, or Firm*—Nies, Webner, Kurz & Bergert

[57] ABSTRACT

A transversely mounted, single pneumatic spring, and dual bell crank and idler link assembly providing a compact counterbalance for hinged closures such as automobile trunk lids. Pneumatic spring enhancements, e.g., a multi-output force feature and a pressure decay compensation feature may be incorporated in the spring unit to enhance opening of the lid and to improve life expectancy of the pneumatic spring by minimizing and effectively negating pressure loss due to leakage of gas past the shaft seal. Excess spring cylinder length can provide space or volume zones used for the enhancement features. Structure which provides a multiple output force for the pneumatic spring, utilizes positioning of the spring shaft end bushing and seal to vary the working volume by changing effective cross-section area of the piston shaft near the end of a compression stroke. The extra cylinder length enables a sealed partition wall to separate extra volume and the operative volume part of the cylinder. The extra volume is filled with a supply of gas under higher pressure than that of the spring operative gas pressure and, in conjunction with permeability characteristics of the spring shaft seal and the partition wall seal, enables compensation for leakage from the cylinder. Multiple force output provisions can be used in a substantially vertically disposed spring, filled with a predetermined quantity of oil.

4 Claims, 6 Drawing Sheets

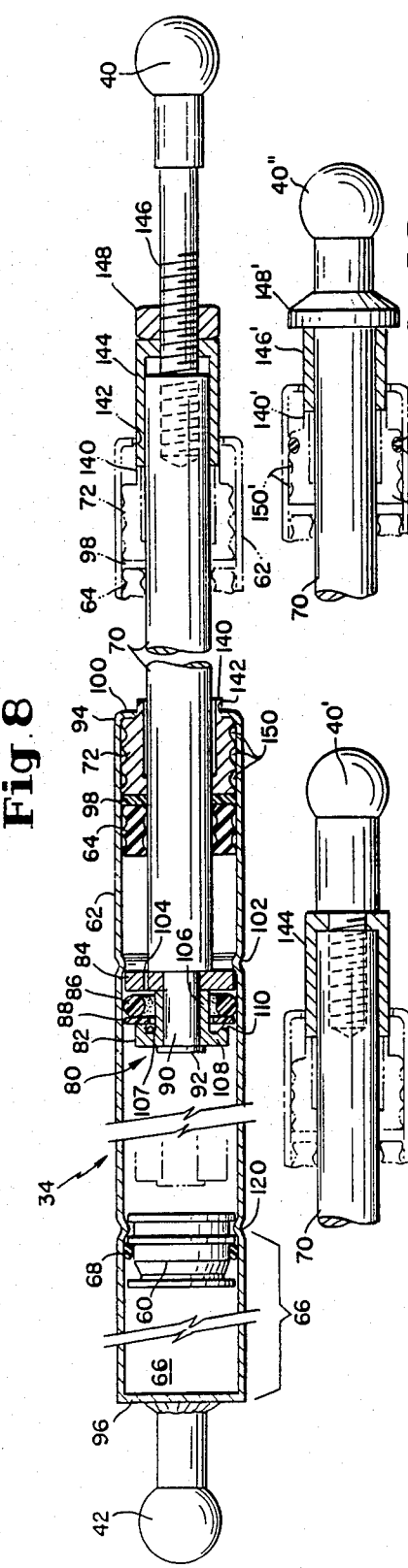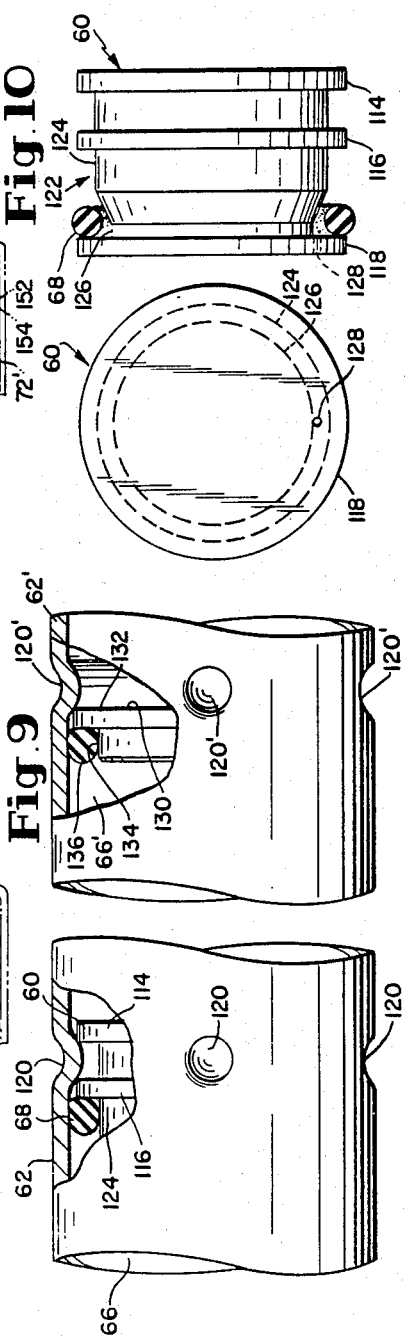

PNEUMATIC SPRING STRUCTURE WITH DIAL OUTPUT FORCE AND PRESSURE DECAY COMPENSATION AND METHOD OF OPERATION

CROSS-REFERENCE TO RELATED APPLICATION

This application is a division of application Ser. No. 946,203, filed Dec. 19, 1986, now U.S. Pat. No. 4,788,747.

BACKGROUND OF THE INVENTION

Articles known as pneumatic or gas springs, which for convenience can be referred to as counterbalance links have become common in commercial articles, particularly in the automotive industry, but they are being used in many other fields wherever the need is present to provide a counterbalance force for closure units, such as lids, doors and cabinet fronts, and gas spring replacement for mechanical spring fittings has become prevalent. In some fields of use, particularly in the automotive field where pneumatic springs are used on each side of trunk lids and hatch backs, the springs counterbalance the weight of the lid or hatch back. The gas springs are retracted, i.e., the spring piston rod is moved into the spring cylinder, when the lids are closed. Then the gas spring units can extend, under gas pressure force acting on the effective piston shaft cross-section area, to move the lid to an open position. As is true of many gas springs, a control orifice by-pass in the gas spring, effectively slows the opening speed of the lid.

In the automotive field, particularly where pneumatic springs are used on hoods, trunk lids and hatch backs, two springs are used, primarily to provide balanced spaced apart forces to counterbalance the weight of the closure and prevent twisting or warping of the closure unit relative to its hinge axis. This invention while developed relative to automotive uses is not restricted to such field. It results in a compact installation using a single pneumatic spring connected through bell cranks and idler links to a hinged closure member. The elongate spring is mounted on and between bellcranks with the spring floating, between positions, in a direction transverse to the hinge axis of the closure. In conjunction with the counterbalance apparatus the pneumatic spring construction has been improved to provide a desired multi-output force feature as well as incorporating a unique method and structure to effectively decrease loss of operative gas pressure within the pneumatic spring resulting primarily from leakage of the gas directly through the shaft seal due to permeability of the material from which the seal is made. The latter aspect can be referred to as permeability compensation or pressure decay compensation.

Examples of transverse springs with bellcrank linkage are seen in the following U.S. Patents: U.S. Pat. Nos. 3,724,797 to H. Freitag et al for Resilient Seat; 4,416,094 to F. Bugener et al for Attic Window Assembly; and Re. 26,162 to A. K. Simons et al for Vehicle Seat Rebound Control. An example of a different dual output force concept in a pneumatic spring can be seen in applicant's U.S. Pat. Nos. 4,451,964 (also 4,451,978) where a floating piston is utilized to provide the dual output force. While not teaching the pressure decay compensation invention of this application, U.S. Pat. No. 4,408,751 to Daniel P. Dodson and George C. Ludwig for Multi-chamber Temperature Compensated Pneumatic Counterbalance shows a fixed partition or wall module providing a separate gas chamber in a pneumatic counterbalance cylinder.

SUMMARY OF THE INVENTION

A transversely mounted single pneumatic spring, bell crank and idler link assembly or apparatus will provide a compact installation for hinged closures such as automobile trunk lids or doors and other similar closures. The spring will float, being attached only to spaced-apart bellcranks. In an automobile trunk installation, where the trunk lid is mounted by hinges or "goose-necks" between each side of the lid and automobile frame, the forward space required for this counterbalance assembly is minimized being installed laterally just behind the rear seat and in the forward upper portion of the trunk. Only one spring unit is required, thus minimizing cost. The spring unit is effectively hidden or concealed at the front upper part of the trunk minimizing damage by items placed in the trunk. Other pneumatic spring enhancements, such as the multi-output force feature of the present invention and the pressure decay compensation feature of the present invention can be incorporated in the spring unit to provide convenient operation of opening the lid and to improve the life expectancy of the pneumatic spring by minimizing and effectively negating pressure loss due to leakage of gas past the shaft seal. If desired, other features such as temperature compensation as taught in U.S. Pat. No. 4,408,751 can be easily added to the pneumatic spring inasmuch as the spring cylinder length can be made substantially longer than the piston shaft, the stroke of which is relatively short. Excess cylinder length provides the space or volume zones used for the various, above mentioned, enhancement features.

The present invention has for a primary object the provision of a compact counterbalance apparatus for use with closure units where a single elongate pneumatic spring having shaft and cylinder end connector links are connected to arms of two spaced apart bellcranks, the other arms of which connect with idler links to a closure unit, secured for hinged movement to the frame structure of the closure, e.g., an automobile trunk lid with associated vehicle frame structure, the spring being supported laterally on the bellcranks so it floats in a plane parallel with the hinge axis of the closure lid.

Additional novel objects reside in the provision of improvements in the pneumatic springs which can be used with the aforementioned transverse spring and bell-crank apparatus to (1) provide a dual or multiple output force for the pneumatic spring by utilizing and controlling positioning of the spring shaft seal to vary the volume and, of prime importance, changing the effective cross-section area of the piston shaft of the spring cylinder near the end of the compression stroke, and (2) to provide a special extra volume chamber in the spring cylinder with a sealed partition wall between the extra chamber and the operative volume part of the spring cylinder and having an auxiliary supply of gas under higher pressure than that of the spring operative gas pressures and with the spring shaft seal and the partition wall seal made from specific material so the gas permeability characteristics of both seals are as desired to compensate for various conditions which cause leakage from the cylinder. As desired, the gas spring used in the counterbalance apparatus can be used with or without any or all of the above noted enhancements to this spring operation.

In conjunction with the foregoing improvement in the dual or multiple force output provisions of the pneumatic spring unit, further objects reside in providing such a spring for substantially vertical disposition filled with a predetermined quantity of oil or the like to enable operation as a liquid pneumatic shock absorber with plural output forces enabled by controlled movement of the shaft to cylinder sealing assembly near the retraction limit position of the shaft. Another object in connection herewith resides in the incorporation of a supplemental disc valve unit which is located near the closed end of the spring cylinder and is provided with an orifice bleed to enable controlled movement, at least in the rebound direction of movement of the counterbalance unit when the shaft is retracted to the higher output force position. The disc valve can be fixed with a small axial floating movement to shift from an effective sealed relationship of its periphery with the cylinder wall to a free flow relationship so that orifice controlled flow is only in the direction of shaft extension under the high output force. The disc can be fixed in the cylinder wall to provide orifice controlled flow in both directions if so desired.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which:

FIG. 8 is a partially sectioned break-a-way plan view of a pneumatic spring link including dual force and pressure decay compensation elements which, if desired, can be used on a spring link for the counterbalance apparatus of FIGS. 1-7, phantom lines showing a full retracted condition where the dual force elements are operative;

FIG. 9 is a detail view showing a second embodiment of the dual force operator sleeve unit;

FIG. 10 is a detail view showing a third embodiment of the dual force sleeve unit where the operator sleeve is a short piece of cylindrical tubing slidable on the piston shaft;

FIG. 11 is an enlarged detail view of the installed pressure decay compensator unit with its O-ring seal in sealed position, as shown in FIG. 8, and with a portion of the cylinder wall broken away;

FIG. 11a is a modified embodiment of the pressure decay compensator depicted in FIG. 11;

FIG. 12 is an enlarged side view of the pressure decay compensator element with its O-ring seal in a non-sealing position;

FIG. 13 is an end view looking at the left hand end of FIG. 12;

GENERAL DESCRIPTION

Figure 1:
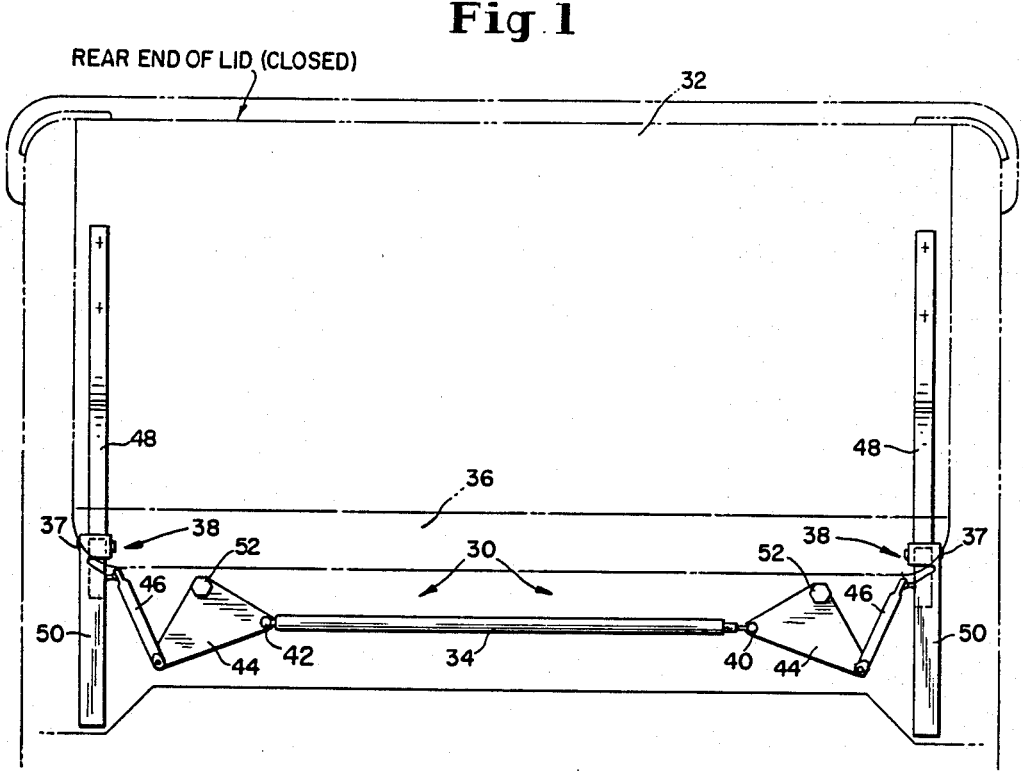
FIG. 1 is a plan view of a counterbalance apparatus with a single transverse pneumatic spring link, bellcranks and associated links, mounted on automobile frame structure within the trunk of an automobile and attached to the lid of the trunk, a portion of the rear end of the automobile with trunk and trunk lid being illustrated by phantom lines with the lid in a closed condition and the spring link in a retracted, compressed condition.
Figure 2:
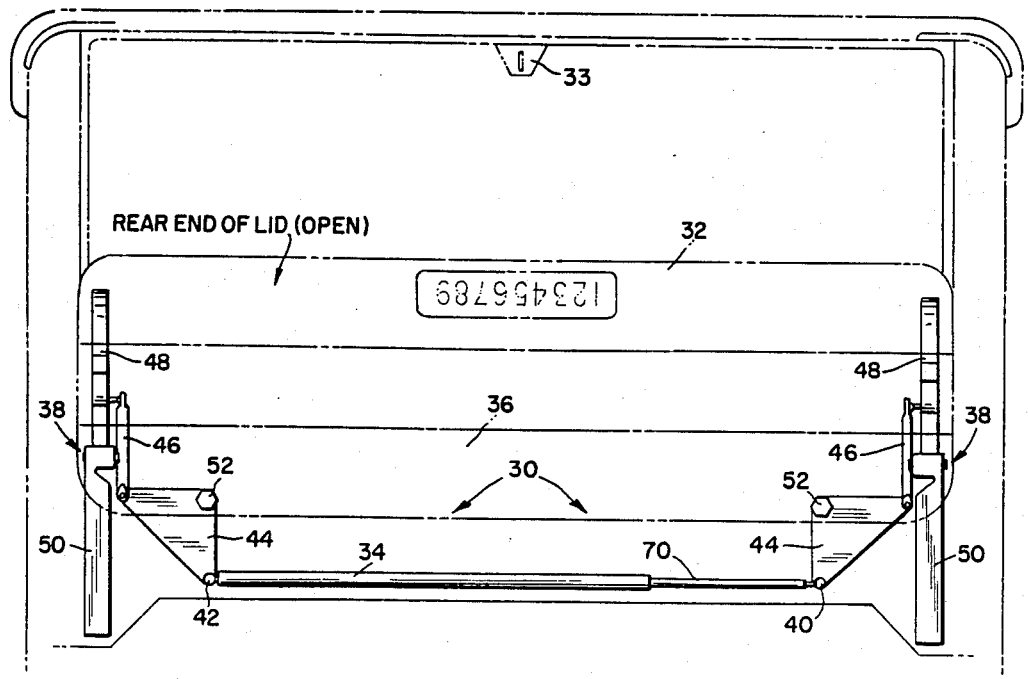
FIG. 2 is a view similar to FIG. 1 but with the trunk lid opened and the counterbalance spring link in its extended condition.
Figure 3:
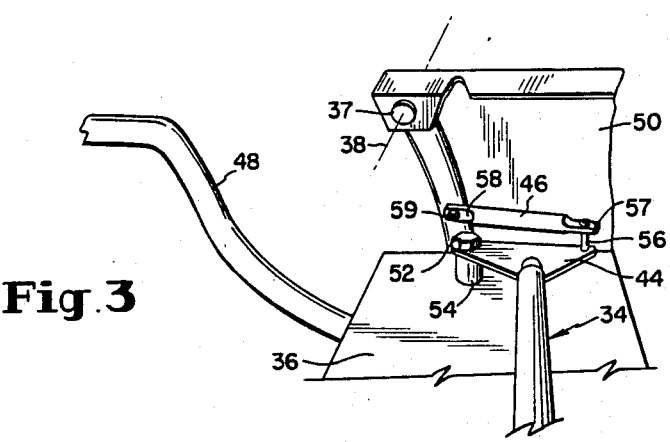
FIGS. 3, 4 and 5 are detail perspective views looking toward the right hand side of the trunk in FIGS. 1 and 2, illustrating relative positions of elements of the counterbalance apparatus and one of the gooseneck hinge fittings for the trunk lid, FIG. 3 corresponding to the closed lid condition of FIG. 1, FIG. 5 corresponding to the full open lid condition of FIG. 2 and FIG. 4 showing a partially opened lid condition.
Figure 4:
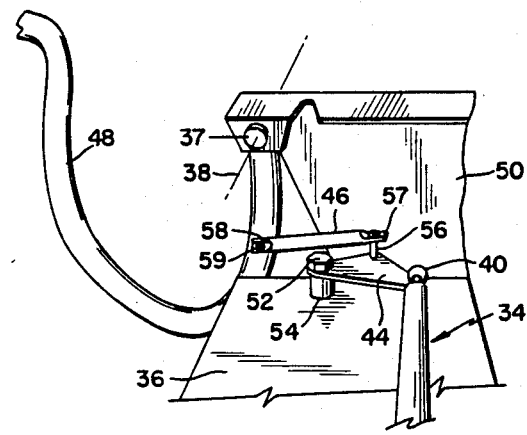
Figure 5:
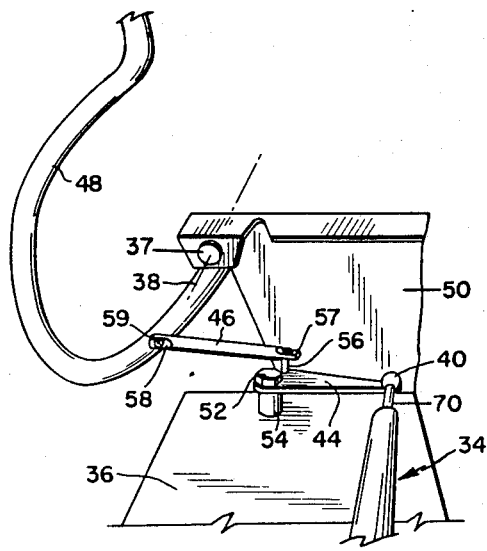

The invention combination herein described is generally shown in FIGS. 1 and 2 and includes a combination of elements which provide a compact counterbalance installation 30 for use with hinged closure lids, hatches or doors. It was developed for use with automobile trunk lids 32 and includes a single pneumatic spring 34 mounted transverse to and in the forward portion 36 of the trunk space under and parallel to the hinge axis 38 of the trunk lid. The invention incorporates an elongate pneumatic spring 34, with pivotal end fittings 40,42 connected to arms of two bellcranks 44 mounted at opposite sides of the trunk space and idler link connectors 46 from the other arms of the bellcranks to the trunk lid 32. The bellcranks are mounted on fixed pivot structure secured to the automobile frame. A convenient attachment for the idler links 46 is to goose neck shaped hinge members 48 rigidly secured to the opposite sides of the trunk lid 32 and hingedly mounted to brackets 50 rigid with the automobile body structure.

The pneumatic spring floats and is attached only to associated arms of the bellcranks and is supported by the bellcranks which as noted are pivotally mounted on fixed pivot posts, journal studs, or the like 52. The output force of the pneumatic spring is equalized at both ends through the fixed pivot bellcranks 44 and in turn through the idler links 46 to the trunk lid 32 which in turn is constrained by its hinge members 48 to swing about its hinge axis 38 between a closed (FIG. 1) and open (FIG. 2) condition as a single, rather rigid, member.

The forces exerted by the spring link can be varied by changing the kinematics of the connections between the spring link and the bellcrank arms and between the bellcrank arms and the connections to the lid or closure member.

The spring link per se can be a conventional pneumatic spring, found commercially in many versions, but the pneumatic spring link 34 herein disclosed and described incorporates several improved features which can be used in combination or separately in many pneumatic spring installations, particularly in automotive use such as with the trunk lid disclosed herein.

The spring link 34 (shown in more detail in FIG. 8), can incorporate a small assembly which, for convenience, will be termed a pressure decay compensator 60 (FIGS. 11, 12 and 13). It helps maintain the internal operative gas pressure in the spring link by replenishing the gas in the operative part of the spring cylinder 62 which over a period of time can leak through the material of the piston shaft seal 64 due to permeability of the seal material. Where installation space permits, an added length of the spring link cylinder is used as a fixed volume chamber 66 to store and maintain a quantity of gas under higher pressure than in the operative part of the spring link cylinder 62. The fixed volume chamber 66 is separated from the operative part of the cylinder by a sealed wall element, the pressure decay compensator 60, the seal 68 of which is made from a material with a similar or a different permeability characteristic as that of the shaft seal 64. Over a period of time, as gas leaks through the shaft seal material, the gas under higher pressure in the fixed volume chamber 66 will leak through or past the material of its wall seal 68 at a similar or differing rate, due in part to losses from dynamic cycle, and will replenish the lost gas from the operative part of the spring link 34. This feature will extend the useful life of a pneumatic spring link. The transverse arrangement of a spring link in an automobile trunk lid counterbalance installation provides more than enough room for an elongated cylinder to contain the fixed chamber, and will still enable the necessary length of stroke of the piston shaft 70 as may be needed for various installations.

A second improved aspect of the herein disclosed spring link 34 is the incorporation of a cooperative assembly of elements enabling an effective multiple output force (e.g., dual, triple, etc.) for the spring link. Pneumatic springs are primarily based on the principle of pressure and volume. In retracted condition, when the piston shaft 70 is moved into the gas cylinder the volume is reduced and gas pressure increases. The piston shaft cross-section provides an area against which the gas pressure inside the cylinder working space creates a force tending to extend the piston shaft. When volume is decreased by a retraction movement of the shaft, the internal pressure is increased an amount proportional to the decrease in volume due to shaft stroke and cross-section. That is true of all pneumatic springs and results in a slightly higher output force when the shaft is retracted than when it is extended. The output force change follows a non-linear slope. The dual output force improvement herein is accomplished in a unique way by forcing the shaft bushing 72 and the shaft seal 64 a desired distance into the cylinder (see phantom lines in FIG. 8) during the final increment of retraction travel of the piston shaft 70. By forcing the shaft seal 64 further into the cylinder, the effective piston (shaft) area is increased, then the total operative cylinder volume is reduced (gas pressure is increased) a greater amount than the reduced volume (and increased pressure) due to retraction movement of the piston shaft. Thus, in a fully compressed condition, when the piston shaft is permitted to extend, because of the bias of the increased effective piston area as well as increased gas pressure due to change of position of the shaft seal, an initial increment of shaft extension is provided which has a higher output force than would otherwise occur.

This latter improvement is highly useful when a gas spring is used in a trunk lid counterbalance installation. A counterbalance should essentially balance the weight of a trunk lid when it is first opened so the lid does not fly open in the face of a person when the trunk is unlatched, yet the spring force, usually due to kinematics of the connecting linkage must be sufficient to move and keep the lid in an open condition once the operator lifts it to an upper position.

Figure 19:
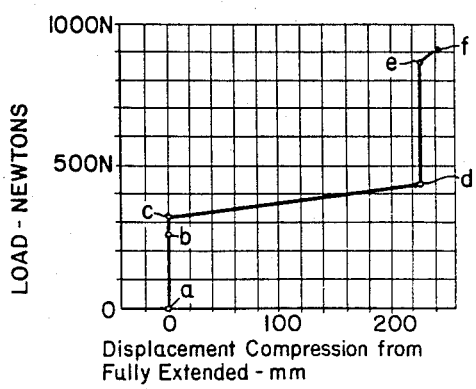
FIG. 19 is a diagramatic chart showing the general nature of a force vs. displacement slope curve for a dual output force spring link like that shown in FIG. 8.

The use of the dual output force improvement in the transverse spring of the trunk counterbalance apparatus will provide an initially high output force during a small increment of spring link extension which will cause the trunk lid to pop open. This pop open force can be predetermined by predimensioning the amount of movement of the shaft seal at the fully retracted shaft condition so that the high pop-up force occurs for a distance causing the lid to open a convenient distance, e.g. two inches (or 50 mm.), and thereupon the spring link output force abruptly decreases to a point where the lid weight is greater than spring output force and the lid stays slightly open. The dual force slopes are illustrated in FIG. 19.

Transverse Counterbalance Apparatus

In the exemplary transverse counterbalance apparatus and its incorporation in an automobile trunk and trunk lid assembly as shown in FIGS. 1-7, phantom lines illustrate the rear part of an automobile. The floor of the trunk including the raised forward shelf or ledge part is part of the automobile body or frame structure and that forward ledge 36 (shown in phantom lines) serves as a convenient body support structure upon which to mount the two bellcranks 44. Both the right hand and left hand bellcranks 44 are identical but mounted in mirror image relationship with their mid fixed mounting pivot locations journalled on journal studs 52 so the bellcrank will be maintained against axial movement on the journal and can pivotally rotate about the journal axes. Each Journal stud can be secured in a known manner, e.g., by being screwed into or bolted to the ledge structure 36 with their axes transverse to the ledge and spaced apart on a line which is parallel to the hinge axis 38 of the trunk lid 32. Spacer sleeves 54 can be used with journal studs 52 to support the bellcranks above the surface of the ledge.

Figure 6:
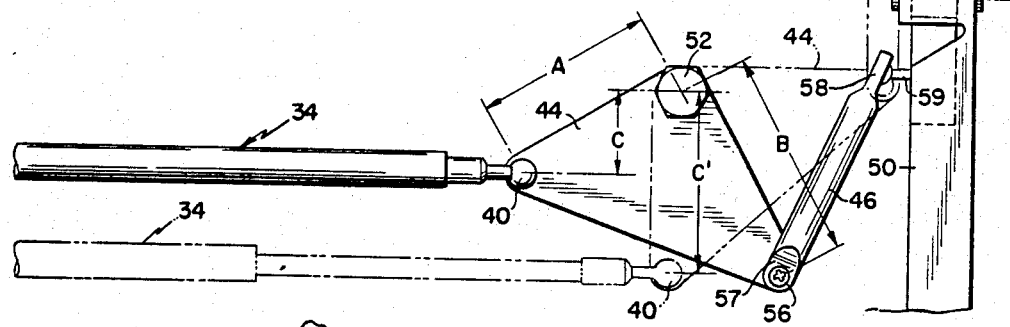
FIG. 6 is an enlarged detail plan view of the right hand portion of FIGS. 1 with solid lines showing the FIG. 1 closed lid positions of the spring link, bellcranks, and the interconnecting links between the bellcrank and the lid hinge fitting and with phantom lines showing the FIG. 2 open lid positions of the same elements.
Figure 7:
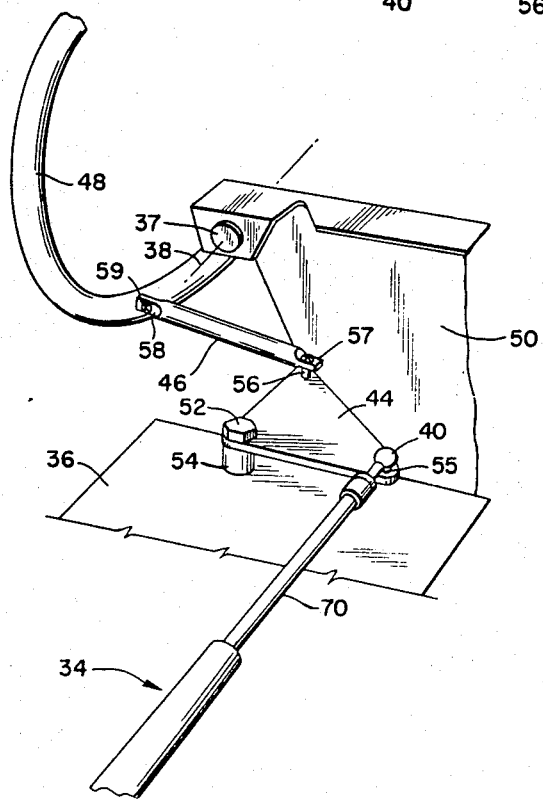
FIG. 7 is an enlarged detail view corresponding to FIG. 5 but viewed from a higher angle to more clearly illustrate the position relationships of the counterbalance elements.

As shown, in FIGS. 6 and 7, each bellcrank 44 is made from flat sheet steel in a right triangular shape and its main pivot support is adjacent the ninety degree angle. Each side portion of the triangle constitutes an arm of the bellcrank. The bellcrank can be made in a conventional L-shape by stamping, forging or other metal forming operations. Adjacent each of the acute corner angles of and projecting up from the upper face of the bellcrank is a ball stud 55, 56 one of which 55 constitutes the connector for one end of the gas spring 34 and the other of which 56 provides a connector for the associated idler link 46. In FIGS. 6 and 7 a socket 40 is shown, and can be rigidly secured by screw threads, welding or the like, to the end of the gas spring shaft 70 and is connected to the bellcrank stud 55 to provide a ball and socket swivel connection. Similarly the idler link 46 has its ends provided with socket formations 57 and 58 that respectively connect with associated ball studs 56 in the bellcrank and a ball stud 59 secured to project from the inner side of the lid goose neck hinge member 48 at a location spaced from the goose neck hinge axis 38 to provide a desired lever arm. Such sockets and ball studs are commercially available. At the closed end of the pneumatic spring cylinder 34 (FIGS. 1 and 2) the socket connector 42 is interconnected to its associated ball stud in the other bellcrank. In lieu of balls and sockets, journal studs and eye connectors can be used as the spring link end connectors and all ball and socket connections can be made in well-known conventional manner to interconnect in a secure fashion and provide the necessary degree of universal swiveling, especially at the idler link connections.

Shown in FIG. 6, the portion A of bellcrank 44 located between the intermediate or middle journal stud 2 and the spring link connector stud 55, constitutes a first bell crank lever arm A which is connected to and transfers force to and from an associated end of the pneumatic spring 34. The portion B of the bellcranks located between the intermediate journal stud 52 and the idler link ball stud 56 constitutes a second bell crank lever arm B which is connected to and transfers force to and from the associated idler link 46 and thence via its associated goose neck hinge member to and from the trunk lid 32.

The trunk lid 32 is a substantially rigid member and in a conventional manner is firmly and rigidly secured to the goose neck hinge members 40 at each side of the front of the lid. The goose neck members are fastened to body frame brackets by heavy journal members 37 secured in the brackets as nut and bolt fittings or flat head journal pins, washers and clips or cotter pins. The hinged lid including the gooseneck hinge member is constrained to pivot about the hinge axis 38 as a rigid unit. Accordingly movement of the trunk lid between open and closed condition, where it is latched by a conventional latch mechanism to a keeper plate 33, is transmitted by equal angular movements of the two gooseneck members 48 via the idler links 46 to equal but opposite arcs of movement of the two bellcranks 44. Because the bellcrank pivot connections 55 to the end connectors on the pneumatic spring will also move in equal arcs and are always aligned along a line which is parallel to the trunk lid hinge axis, the connected pneumatic spring 34 will be disposed on an axis between the bellcrank studs 55 which always remains parallel with the trunk hinge axis although it floats between a forward and a rearward position as the lid is moved between open and closed condition.

Shown in FIG. 1 and in solid lines in FIG. 6, the spring link 34 is in its compressed or retracted condition in which the first set of bellcrank arms A extend at a slight inclination, shown as about 20 degrees to the elongate spring link. The spring force is initially exerted via a short moment arm C (FIG. 6) to the bell crank 44 which biases the left and right bellcranks 44 as viewed in FIG. 1 with a clockwise force and counterclockwise force respectively. While the moment arm from bellcrank pivot 52 to the axis of idler link 46 varies slightly throughout the movement of trunk lid between closed and open positions, as shown in the representative kinematic layout, the moment arm remains essentially the length of lever arm B.

Hence the initial output force of spring link 34 is applied through a short moment arm via the bell crank to a longer moment arm thence via the idler link 46 and the goose neck hinge member to the trunk lid. Thus, without the aforementioned dual force output included in the spring link the output force applied to the trunk lid is generally lower than the trunk lid load. When the trunk lid is first unlatched, the spring force and the kinematic linkage arrangement is normally designed so the weight of the trunk lid is balanced by or is just slightly under the force transmitted by the linkage from the spring link. That relationship keeps the lid from rapidly moving up to an open position.

As seen in FIG. 6, it will be apparent that, as the lid is moved upward, either manually or by a slight excess transmitted spring force via the bellcrank, the moment arm C increases in length toward a maximum C' which is equal to the lever arm A. Since the output moment arm acting on link 46 is still near or equal to its maximum length B, the output force of the spring link 34 applied to the trunk lid is increased to move the lid to an open condition without manual aid, and will then maintain the lid in open condition.

It is to be understood that when the dual force feature is included in the transverse spring, an initial high output force will cause the pop-up function of the trunk lid, as was hereinbefore described.

Most pneumatic springs are constructed with an orifice bypass bleed which controls gas flow due to expansion as the spring link piston shaft is extended. This slows down the speed of the expansion or extension of the pneumatic spring link and is preferred in any pneumatic spring used to counterbalance automobile trunk lids, hoods, and hatch backs. The spring link 34 used in the transverse counterbalance apparatus 30 preferably has such an orifice bleed bypass construction. One such form of orifice bleed bypass is disclosed and described in conjunction with the pneumatic spring shown in detail in FIG. 8. That pneumatic spring embodiment includes the dual force feature and the pressure decay compensation feature either or both of which can be included in the spring link 34 used in the transverse spring link counterbalance apparatus of FIGS. 1–7.

The illustrated and described transverse spring link, bellcranks and idler link apparatus 30 represents one example of an installation for an automobile trunk lid. It will be understood by experienced engineers that the geometry and kinematics of the linkages can be varied to meet different installation requirements. The pneumatic spring stroke can be increased or decreased, the geometry of the bellcranks can be modified by changing the lengths of one or both arms and/or changing the angle between the arms. One example of changed geometry could be to increase the angle between the two arms of bellcrank 44 so the moment arm C of arm A passes slightly overcenter, past zero without permitting the other arm B to move past the bottom center location. The geometry and kinematics of such an arrangement will provide a spring force being applied to maintain the lid in a closed latched condition requiring a deliberate manual movement of the trunk lid for a short distance against the spring force to an initial opening which will swing the bellcrank arms connected to the spring link past the zero dead center location, whereafter the spring force will be active to counterbalance the trunk lid and provide the forces necessary for spring assisted or spring operated opening of the trunk lid to a full open condition.

Improved Pneumatic Spring

FIG. 8 illustrates the components of counterbalance link 34 with a cylinder 62 whose length will be determined by the kind of equipment with which the unit is used. Within the cylinder is a piston assembly 80 which separates the cylinder into two operative compartments filled with gas (e.g., air, nitrogen or some other inert gas) under pressure. The piston assembly includes a free fitting piston 82, a piston washer 84, a piston ring 86, a piston ring washer 88, and the piston rod or shaft 70 secured at one end 90 to the piston assembly 80 as by swaging over or riveting the end at 92. These pneumatic counterbalance units, particularly in automotive installations are often pressurized up to around 2000 psi gas pressure. Pressures can be higher or lower depending on the installation. A counterbalance unit with a piston rod having approximately 0.10 inch cross-section area will provide a 5 pound extension force when the cylinder is pre-pressurized at approximately 50 psi, and a 200 pound force when pressurized at 2000 psi.

The piston shaft 70 projects out through one end 94 of cylinder 62, the other end of which is completely closed, as by welding an end plug or disc 96 thereto. The projected end of shaft 70 has a connector link 40 rigidly secured thereto, as by screw threads or welding, and a second connector link 42 is secured to the cylinder closed end unit 96, as by screw threads or welding. Within the cylinder, shaft 70 passes through a large bi-directional ring seal 64 (shown as a six lobe seal but which can be an O-ring or a Quad-seal), a Teflon washer 98, and a shaped bushing 72 which has a free fit around the shaft 70 and within cylinder 62. With the cylinder end 94 crimped at 100, internal gas pressure keeps the seal 64, washer 98, and bushing 72 in the end position against the crimped end of cylinder 62. The rolled indentation 102 in the cylinder wall provides an end stop abutment for piston movement. While not shown, a predetermined small quantity of oil, e.g. 3–4 cc, is normally placed into cylinder 62 prior to assembly and provides lubrication for the piston O-ring 86 and the large bi-directional shaft seal 64, and in some installations, will provide liquid for damping at the end of the expansion stroke.

Suitable materials for the various components can be mandrel drawn hydraulic steel tubing for the cylinder, sheet steel for the end disc; the piston shaft is hardened, chrome plated steel; the bushing 72 is preferably made from half hard brass but can be made from other materials, such as aluminum or steel, the [Quad-ring] bi-directional shaft seal and O-ring seals are elastomeric, e.g., synthetic rubber or plastic, and the piston components 82 and 84 are made from sintered copper steel or they can be made from other materials, such as plastic, bronze, brass, aluminum, etc.

The piston assembly and its piston ring components 86 and 88, are constructed to provide controlled by-pass flow of gas from one side of the piston to the other side. There is a relatively free flow by-pass provided during the retraction or compression stroke and an "orifice" metered flow of gas past the piston during the extension or expansion stroke. A similar piston construction is shown in U.S. Pat. No. 4,570,912.

The washer part 84 of the piston assembly has a cylindrical periphery with an O.D. providing a close free sliding fit with the I.D. of cylinder 62. Because the washer 84 is rigidly secured on the shaft and a port of its periphery will always contact the cylinder wall because of a slight wobbling of the shaft during its reciprocation, the washer can provide an excellent electrically conductive path between the shaft and the cylinder. The inner bore of washer 84 fits over the reduced end 92 of the piston shaft, and in assembly the washer 84 and piston part 82, as a rigid spool-shaped unit, are clamped by swaging at 92 against the shoulder at the reduced end 90 of shaft 70. A rather large axially directed through passage 104 through the piston washer part 84 provides a free flow path through the washer 84. If desired, passage 104 could be an orifice passage.

The other piston part 82 is cylindrical with a central through bore which slides over the piston shaft reduced end 90. Its side adjacent the washer 84 is shaped with a reduced diameter center boss 106 having a flat end face abutted against the washer 84. The outer circumference of piston part 82 has a lesser diameter than the I.D. of the cylinder so there is a free annular space enabling unobstructed flow of gas between piston part 82 and the cylinder wall. When assembled the piston parts 82 and 84 constitute the above noted effective spool shaped piston with the ring shaped washer 88 and the O-ring 86 retained in the peripheral space between the parts 82 and 84.

Piston part 107, radially outward from and between the central boss 106 and an outer peripheral, axially directed, flange 108, is axially recessed to provide free flow space from the center boss to the outer flange 108. Flange 108 has a narrow terminal annular edge which is disrupted by one or more very small shallow orifice grooves 110. The ring shaped flat washer 88, is loosely retained between the axial flange 108 of part 82 and piston O-ring 86, both of which can shift slightly in the groove between piston parts 82 and 84. Gas under pressure in the chamber of the counterbalance cylinder occupied by the piston shaft attempts to flow through passage 104 in piston washer 84 into the chamber at the closed end of the cylinder but the O-ring piston seal 86 seals against the cylinder wall and prevents gas flow past the O-ring which is moved under gas pressure to seal against the washer 88, which force urges the washer against the end edge of the piston flange 108 which creates a metered flow path through the orifice which occurs between the washer 88 and the orifice groove 110 in the flange 108.

When the piston is forced to a compressed counterbalance condition (movement to the left in FIG. 8) washer 88 moves away from the piston flange 108 and permits unrestricted gas flow from the closed end of the cylinder, into the recess of piston part 82, through the aperture 104 of the piston washer 84, thence the other chamber of the counterbalance unit.

The crimped end of cylinder 62 contains the end retainer bushing 72 and the bi-directional seal 64. Note: the I.D. of the outer portion of bushing 72 is slightly larger than the shaft O.D. to avoid a close running fit which could create undesirable friction drag. However, the piston shaft will normally cant slightly and contacts the inside of the bushing 72 along a line contact which can aid in providing an electrical conductivity path if the link is used as an electrical connector.

The Teflon washer 98 provides a resilient backing for the bi-directional seal 64 which provides a multiple circumferential line contact with both the shaft 70 and interior cylinder surface, in effect acting like plural small O-rings. The six lobe seal 64 serves as an excellent bi-directional seal between the shaft and cylinder with relatively low friction forces against the shaft during expansion and contraction strokes. When a bi-directional seal is used with a cylinder configured in accord with this disclosure, the cylinder should be pressurized with the gas prior to and while the seal around the shaft is inserted into the cylinder as is taught in the aforementioned U.S. Pat. No. 4,451,964.

Pressure Decay Compensator

FIGS. 11, 12 and 13 show one construction of the pressure decay module 60 and its installation in a pneumatic spring cylinder as hereinbefore discussed. FIG. 11 is an enlarged detail of a part of the spring link 34 seen in FIG. 8. The module 60 is preferably made from metal, e.g., aluminum, brass or the like and as seen in FIG. 12 i essentially cylindrical with three annular peripheral flanges 114, 116, 118 dimensioned to provide a close free fit within cylinder 62. Flanges 114 and 116 enable the module 60 to be fixed at a desired location as by dimpled indents 120 in the wall of cylinder 62.

The annular recess 122 between flanges 116 and 118 is divided into two annular areas of different diameters. Area 124 is a sealing surface, adjacent the middle flange 116, which transitions inward to a reduced annular diameter portion 126 adjacent the flange 118. The reduced diameter portion 126 provides an annular pocket which, when the O-ring 68 is disposed against flange 118, prevents the O-ring 68 from sealing against the reduced diameter portion 126, as shown in FIG. 12. A small hole 128 at the base of flange 118 provides a flow passage through the flange 118.

During assembly of the spring unit, the module unit 60 with the O-ring 68 assembled in recess 122 (FIG. 12) is inserted into the cylinder 62 to the desired location (FIG. 8) and retained in position by forming the dimples 120 in the cylinder wall. The cylinder preassembly is then subject to pressurization by applying gas under pressure through the shaft end of the cylinder. Such pressurization forces the O-ring 68 to a position against flange 118 which enables gas flow past the module flanges 114, 116 through the I.D. of O-ring 68 and thence through the passage 128 in flange 118 to load the fixed volume chamber 66 at the higher gas pressure desired to provide the pressure decay compensation aspect of this invention.

When fixed volume chamber 66 is loaded to the desired pressure, the pre-loading pressurization is completed, and open end of the cylinder 62 is vented, creating a differential pressure across O-ring 68 which causes the O-ring to move into sealing engagement with module recess surface 124, the interior wall surface of the cylinder 62 and the side surface of flange 116, as shown in FIG. 11, effectively maintaining the desired highly pressurized volume of gas in fixed volume chamber 66.

The remaining assembly of spring components shown in FIG. 8 can then be completed, e.g., as taught in the aforementioned U.S. Pat. No. 4,451,964.

FIG. 11a shows a slightly different construction of a pressure decay module 130 which is a solid metal disc with a stepped periphery forming an annular flange 132 on one side and a reduced diameter annular cylindrical sealing surface 134. A sealing O-ring 136 (corresponding to O-ring 68) is disposed in sealing engagement on the annular surface 134, against the surface of flange 132 and the internal surface of cylinder 62'. The diameter of flange 132 is dimensioned to provide a close free fit within cylinder 62'. The location of module 130, retained against axial movement toward the shaft end of the cylinder, is determined by its axial abutment against several dimpled indents 120' formed in the cylinder after insertion of the module 130 to the proper position. Note this embodiment rather than being assembled and fixedly located in the cylinder and then pressurized, must be inserted into the cylinder under a pressurized environment in a manner similar to that taught in U.S. Pat. No. 4,451,964. It will be clear that the pressure of the gas which will be then contained in the fixed volume chamber 66' will be substantially greater than the pressurized environment within which the module 130 is assembled into the cylinder. Specific pressures can be readily calculated by a skilled engineer.

The embodiment of FIG. 11a is less expensive than that of FIG. 11, and provide a method for mechanical pressure check for correct pressure in fixed volume chamber 66' and containment of the gas under such pressure by the seal 136. Checking can be accomplished, before the spring assembly is completed, by applying a mechanical force against the module 130 in a direction toward the fixed volume chamber until the module is displaced away from the indents 120' and sensing the force required at the instant that displacement occurs.

Multi-Output Force

Dual Output Force

The pneumatic link 34 shown in FIG. 8 has structure which enables a dual output force to be obtained. The unit depicted in FIG. 8 includes a bushing 72, a Teflon washer 98 and a multilobe seal ring 64 which provides a bi-directional sealing engagement between the shaft 70 and the wall of cylinder 62. In previously known gas springs the bushing is maintained against the retaining means (e.g., crimped edge 100, in FIG. 8) at the open end of the cylinder by the high pressure of the gas contained in the cylinder or the bushing can be rigidly fixed at the open end of the cylinder. As clearly shown in FIG. 8, there is an open length of cylinder space between the left end of the bushing seal 64 and the rolled indentation 102 which enables shifting of the bushing 72, washer 98 and seal ring 64 inwardly against gas pressure, into the cylinder 62 essentially until just before the seal ring reaches the rolled indentation. This construction and resultant functional cooperation enables use of existing bushing and seal structure to accomplish a second stage of a higher output force from previously known single stage gas springs, by using a movable bushing and seal together with a shaft mounted abutment, as shown at 144 in FIG. 8, to increase the effective area that the internal gas pressure is acting upon to create the output force.

As shown in FIG. 8, bushing 72 has an annular end abutment 140 which is accessible through an annular space 142 between the cylinder crimped end 100 and shaft 70 to the exterior of the gas spring. The bushing abutment 140 can be engaged by a cylindrical abutment member 144 placed on the end of shaft 70 between the end connection 40 and the cylinder. In FIG. 8 the abutment member 144 is a cylindrical cup rigidly secured on the end of shaft 70 by a screw fitting 146 portion of the end connector. The cup-shaped abutment member 144 is threaded onto the screw fitting 146 and fixed in position by lock nut 148. The end fitting with the secured abutment member 144 can be adjusted in length by screwing it into or out of the shaft 70.

As is apparent, shaft 70, when moved in the retraction direction to an intermediate position, will cause the sleeve portion of abutment member 144 to coextensively engage the bushing abutment 140. Further movement of shaft 70 toward retraction, via the engaged abutments 144 and 140, causes the bushing 72 and seal 64 to translate with the shaft into the cylinder 62 up to a predetermined position which by design should avoid impingement of the seal 64 against the rolled indentation 102. The distance which the bushing can be inserted by the abutment 144 is determined by the location of bead 102, bearing in mind that the length of the sleeve of abutment 144 can be dimensioned to any desired length within the structural capabilities of a particular specific spring design.

FIG. 9 shows a modified construction of the end fitting 40' with the same cup-shaped abutment 144. In this embodiment the end fitting 40' also screws into the shaft 70 but a shoulder on the end fitting abuts and clamps the cup-shaped abutment 40' rigidly against the end of shaft 70.

FIG. 10 illustrates a further embodiment of the shaft mounted abutment which is a short cylindrical sleeve 146' mounted on shaft 70 for limited slidable movement. The end fitting 40'' in this instance can be secured in the end of shaft 70 by any known manner, such as resistance welding or screwing to the end of the shaft. The end fitting 40'' is made with a radial annular flange 148' which is greater in diameter than sleeve 146 and is used to abut sleeve 146' and force the sleeve into engagement with the bushing abutment 140'. Bushing translation and stepped second force output is essentially the same for structures of FIGS. 9 and 10 as described above for FIG. 8.

Turning back to FIG. 8 the bushing 72 on its outer circumferential surface is provided with a plurality (3 are shown) of annular spaced apart grooves 150. These grooves are intended to contain and retain a corrosion preventative lubricant to inhibit deterioration of the cylinder's inside surface, specifically the portion of the cylinder which is translated by seal 64 whenever the bushing and seal are shifted as described. As shown in FIG. 10, the bushing 72', besides having grooves 150', corresponding to grooves 150 of FIG. 8, incorporates an O-ring seal 152 in a retaining groove 154 to further aid in containing and retaining the corrosion preventative lubricant around the periphery of the bushing.

To illustrate the manner in which the two steps of force output which are achieved by use of the dual output gas spring illustrated in FIG. 8, and hereinbefore described, a generalized exemplary force vs. displacement chart shown in FIG. 19 will be referred to. The values and curve depictions used in this description are merely exemplary, although taken from dynamic recordings of an actual spring, and aid in an understanding of the characteristics of the dual output force spring link. When the spring link 34 is fully extended and in a free state under no load (solid lines in FIG. 8) the displacement is zero and output load is zero as indicated at a in FIG. 19. When the spring link is installed, e.g., to counterbalance an open trunk lid, the spring link acts as a fixed link which maintains the lid in an open position represented by point b. Upon closing of the lid an initial closing force is applied, manually or otherwise, on the lid, which force is transferred to the spring link. When applied force places a load on the extended link equal to, e.g., 330 Newtons, compression of the spring link shaft is initiated, i.e., starts to retract, as represented by point c. Further closure movement of the lid continues to compress (retract) the spring link which causes a displacement of the shaft into the cylinder a predetermined distance (224 mm. as shown on the chart) until the shaft abutment 144 engages the bushing abutment 140, represented by point d on the chart. Note, up to this point, the action is that representative of a conventional gas spring link, not having the abutment units which enable the subsequent second step in a dual output gas spring in accord with this invention.

In our example at point d the trunk lid is not fully closed. To close the lid completely the shaft must be further displaced into the cylinder which, because of the engagement of the noted abutments 144 and 140, will cause the bushing 72 and seal 64 together with the shaft 70 as a unit to be inserted into cylinder 62, requiring a substantially higher force, e.g., 880 Newtons, to initiate (point e) the additional spring link displacement. The further movement of the lid, with accompanying spring link compression to a fully closed position (point f), is represented by the load vs. displacement curve between points e and f.

Triple Output Force Embodiments

The principals of the dual output force spring link, may be expanded to a spring link with any number of output steps, within reason.

FIG. 17 (a, b and c) illustrate the multi-output force principal used in a gas spring which has a triple output force capability. Spring link 160 includes the cylinder 162, shaft 164 with its end connector and piston assembly 166 which are essentially the same as described for FIG. 8 and hence there is no need to describe these basic spring link components in further detail.

In this spring link 160, rather than using a single piece bushing, the bushing is a two part telescoping bushing assembly 168 consisting of an outer cylindrical bushing 170 and an inner coaxial cylindrical bushing 172. The outer bushing 170 has a stepped outer end 174 which includes a reduced diameter projecting collar shaped abutment 176 with its O.D. dimensioned to freely translate through the opening in crimped end 178 of the cylinder 162. Adjacent stepped end 174 there is a seal ring groove 180 in the outer circumference of bushing 170 which receives a bi-directional seal 182 (e.g. a quad seal) to provide dynamic sealing against the cylinder and a static seal with the outer circumference of bushing 168.

The inside of bushing 170 is made with a stepped cylindrical through bore 184, 186, which receives the inner bushing 172. The inside diameter of the portion 186 of the stepped bore is enough larger than the shaft diameter to permit a projected abutment collar 188 of the inner bushing to translate with a free close fit through the outer bushing and its abutment collar 176.

Inner bushing 172 has its inside cylindrical passage 190 of constant diameter to provide a sliding fit on shaft 164. The outer circumference of bushing 172 is stepped to provide the projected collar 188 and a coextensive interior end portion 192 of larger outer diameter than the collar 188, which has a sliding fit within the bushing portion 184 of outer bushing 170. The exterior radial surface step 194 of inner bushing 172 will engage the interior radial surface step 196 of outer bushing 170 and determines the extended condition of the inner bushing 172 relative to the outer bushing. The extended condition of the outer bushing 170 is determined by abutment of its outer stepped end 174 against the crimped portion 178 of the cylinder.

To complete the shaft to bushing sealing, a bi-directional seal 198 is placed over the shaft 164 inside of bushing 170 and against the interior end of bushing 172. Seal 192 is shown as a double quad seal, but could be any suitable seal ring, e.g., cheveron, a square ring, O-ring or a multiple lobe seal. Gas under pressure is retained within the cylinder by the combination of the two telescoped bushings 170, 172 with their associated seals 182 and 198 and the crimped cylinder end 178.

The gas pressure acting on the effective cross-section of the outer and inner bushings and their seal rings provides biasing forces on the bushings toward the bushing extended condition.

The end connector 165, rigidly secured on shaft 164 provides an abutment surface 200 which can engage the ends of inner bushing collar 188 and outer bushing collar 176 in sequence as the spring link is compressed and the shaft is moved in retraction into the cylinder.

Figure 17A:
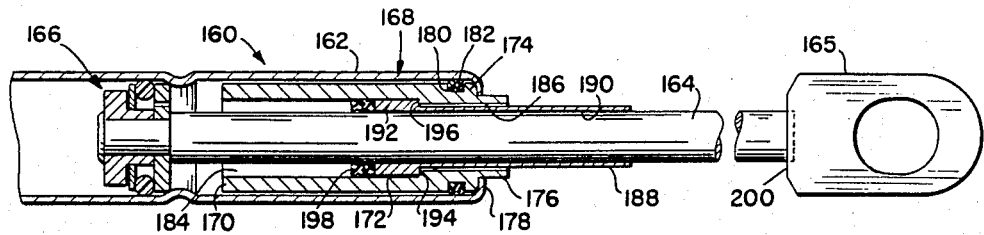
FIGS. 17a, b and c are three diagramatic section views showing a further embodiment of a multiple output force pneumatic spring link which provides a triple output force, FIG. 17a showing the shaft fully extended, FIG. 17b showing the shaft and one bushing part in the second output force position and FIG. 17c showing the shaft and both bushing parts in the third output force position.
Figure 17B:
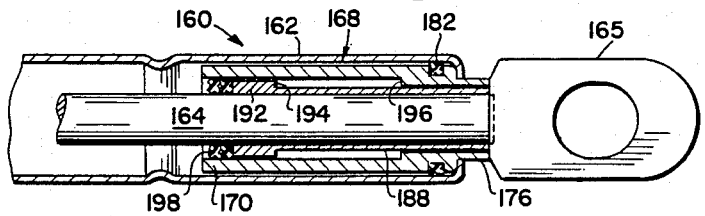

FIG. 17a shows the shaft 164 fully extended and both of the telescoped bushings fully extended. FIG. 17b illustrates the shaft moved to an inward position where its end fitting abutment 200 has engaged the inner bushing collar 188 and pushed the inner bushing 172 to its fully inserted position relative to the outer bushing 170. This movement of inner bushing 172 together with the conjoint movement of shaft 164 causes the second stepped load increase.

Figure 17C:
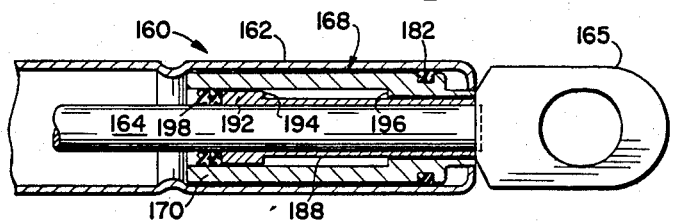

FIG. 17c illustrates the shaft being moved further inward from the position of 17b to a position where the end fitting abutment 200, still engaging the inner bushing collar 188, has also engaged the collar abutment 176 of the outer bushing 170 and has pushed the entire bushing assembly 168 and the shaft 164 to a complete fully inserted position relative to cylinder 122. This stage of movement of the entire bushing assembly together with the conjoint movement of the shaft causes the third stepped load increase.

Figure 18:
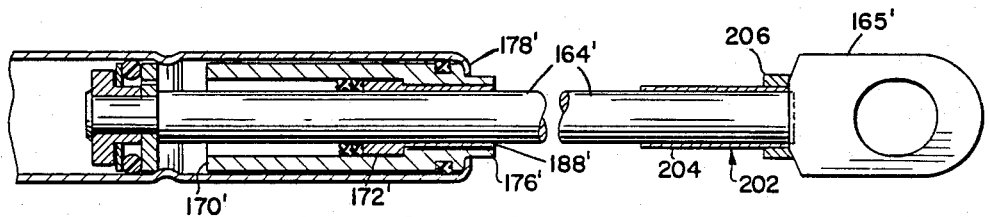
FIG. 18 is a further embodiment of the triple output force spring link of FIG. 17a where a stepped collar on the shaft can be used in lieu of the stepped lengths of the two bushing parts.

FIG. 18 shows an alternate embodiment wherein the telescoped bushing parts 170' and 172' have collar abutments 176' and 188' which terminate in the same radial plane when fully extended. The abutment structure enabling sequential insertion of the inner and outer bushings in this instance, is a stepped tubular collar 202 on shaft 164' which may be fixedly attached to end connector 165' or, as an integral unit, be allowed to slide freely on shaft 164'. The smaller diameter portion 204 of collar 202 is dimensioned to engage inner bushing collar 188' and the larger diameter portion 206 is dimensioned to engage outer bushing collar 176' and freely pass through the crimped end 178' of the cylinder. The coaction between the shaft abutment parts of collar 202 and the inner and outer bushings as the shaft is pushed from extended position to fully retracted position is the same as the stepped stages described in conjunction with FIG. 17.

The length dimensions of the projected collar parts 176 and 188 of the bushings assembly 168 in FIG. 17 as well as the length dimensions of the stepped portions 204 and 206 of the stepped tubular collar 202 of FIG. 18 can be configured as required to obtain desired characteristic of the multiple output force spring link.

Figure 20:
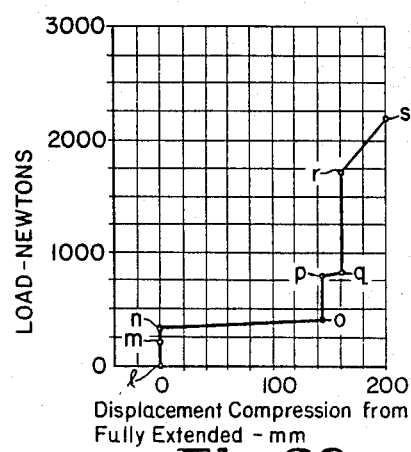
FIG. 20 is a second diagramatic chart showing the general nature of a force versus displacement slope curve for a triple output force spring link like that shown in FIG. 17.

To illustrate the manner in which the three steps of force output which are achieved by use of the triple output gas spring illustrated in FIG. 17 (a, b and c) hereinbefore described, a second generalized exemplary force vs. displacement chart shown in FIG. 20 will be referred to. As with FIG. 19 the values and curve depictions are merely exemplary, but are also derived from dynamic recordings of an actual spring. When the spring link 160 is fully extended and in a free state under no load (FIG. 17a) the displacement is zero and output load is zero as indicated at 1 in FIG. 20. When the spring link is installed, e.g., to counterbalance an automobile hood, the spring link acts as a fixed link which maintains the hood in an open position represented by point m. Upon closing of the hood, an initial closing force is applied, manually or otherwise, on the hood, which force is transferred to the spring link. When applied force places a load on the extended link equal to, e.g., 370 Newtons, compression of the spring link shaft is initiated, i.e., starts to retract, as represented by point n. Further closure movement of the hood continues to compress (retract) the spring link which causes a displacement of the shaft into the cylinder a predetermined distance (144 mm. as shown n the chart) until the shaft abutment 200 engages the inside bushing abutment 188, represented by point o on the chart. Note, up to this point, the action is that representative of a conventional gas spring link, not having the abutment units which enable the subsequent second and third steps in a triple output gas spring in accord with this invention.

In this example, at point o the hood will not be fully closed, e.g., the hood position could be just before the conventional hood safety latch engages. Further movement of the hood past its conventional safety latch position to a position just prior to the fully closed hood latched position will cause the inner bushing 172 and its seal 198 together with shaft 164 as a unit to be inserted into the cylinder, requiring a higher force, e.g., 750 Newtons, to initiate (point p) the additional second stage of spring link displacement represented by the portion of the curve between points p and q. At point the shaft abutment engages the abutments 188 and 176 of both the inner and outer telescoped bushings 172 and 170, as shown in FIG. 17b.

The final movement of the hood to its fully closed position (where it will be latched by a main hood latch) will cause both of the inner and outer bushing parts and their seals together with the shaft as a unit to be inserted a further distance into the cylinder, shown in FIG. 17c, requiring a still higher force, e.g., 1750 Newtons, to initiate (point r) the final and third stage of spring link displacement represented by the portion of the curve between points r and s.

There are many examples of uses for pneumatic counterbalances which can benefit from multiple output force characteristics of this invention and which could be in two, three, four or more stages. The following portion of this description represents use of a dual output force spring for a vehicle suspension.

Hydro-Pneumatic Dual Force Spring Link Embodiment

Figure 14:
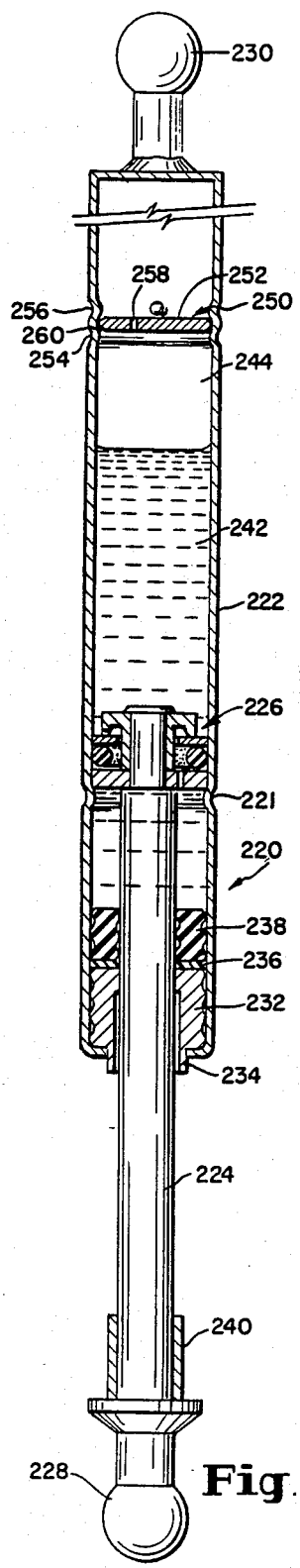
FIG. 14 is a partially sectioned break-a-way plan view of a second embodiment of a dual force hydropneumatic spring link in extended condition.
Figure 15:
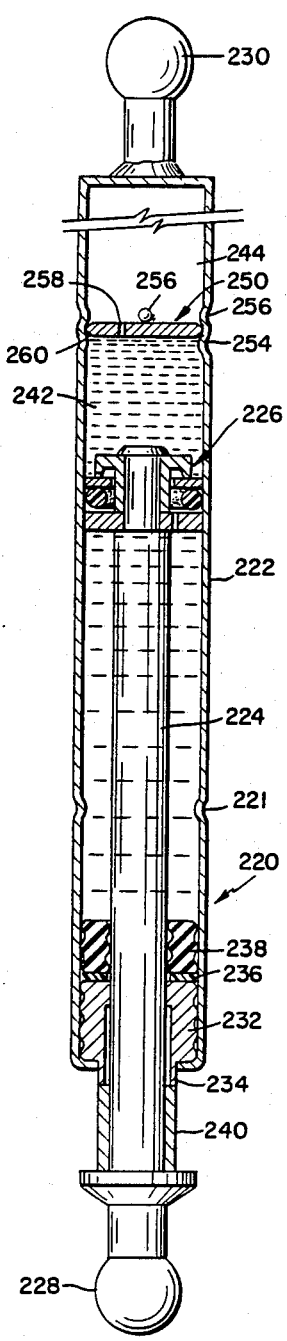
FIG. 15 is a view similar to FIG. 14 but with the piston shaft partially retracted to a normal spring compressed condition.
Figure 16:
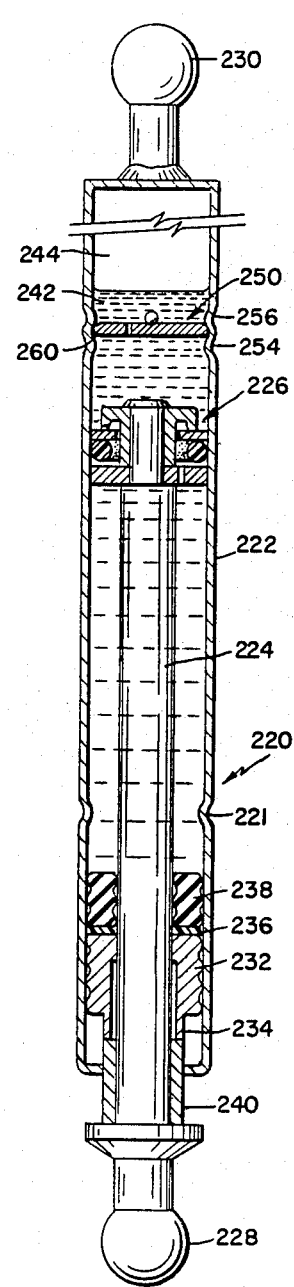
FIG. 16 is a view of the spring of FIGS. 14 and 15 with the piston shaft in fully retracted condition where the dual force sleeve has been moved to relocate the bushing and shaft seal to increase the effective shaft cross-section area and then to decrease the cylinder gas volume and provide increased pressure on the gas.

FIGS. 14, 15 and 16 illustrate a modified embodiment of the dual output force spring link illustrated and described in conjunction with FIG. 8. This example represents a spring link used as a vehicle suspension strut in which the cylinder and shaft are essentially in vertical disposition with the shaft end down. It supports the vehicle by a spring suspension and also provides dampening and shock absorbing of vehicle displacements and oscillations.

The spring unit 220 consists of basic spring components, namely a closed end cylinder 222, a shaft 224 connected to a piston assembly 226, and end connectors 228 and 230. A special bushing 232 with projected collar 234, Teflon washer 236 and multilobe seal 238 are illustrated and serve the same purpose as described in conjunction with FIG. 8. In this assembly a shaft associated abutment member 240 is a tubular sleeve slidable on the shaft 224 similar to the modification of FIG. 10. The aforementioned components of spring link 220 are essentially the same as shown in FIG. 8.

This spring link will generally be relatively short. FIGS. 14-16 of the original drawing are essentially full scale views with a cylinder length of approximately 8 inches in length (200 mm.).

Spring link 220 contains a predetermined quantity of hydraulic fluid 242 (lubricating oil) and gas 244 under a predetermined pressure. Shown in a fully extended position in FIG. 14, the piston assembly abuts a rolled indentation 221 which provides the extended shaft limit position.

To provide a desired dampening function the oil level must be such that the piston assembly 226, which can be made with or without the controlled flow structure and characteristics of the piston assembly 80, shown in FIG. 8, remains completely submerged in oil throughout its stroke from extended position to at least an intermediate position where the shaft abutment 240 engages the bushing collar 234. During the remainder of the shaft retraction stroke, when the bushing 232 is being translated (pushed in) the piston assembly no longer has a dampening function because there is no longer a flow of fluid across the piston. During this second stage the output force is effectively an undamped gas spring force due to compression and expansion of the volume of gas 244. Note the value of pressure of the preloaded gas under pressure will be determined by the output force required for a specific vehicle. Light weight vehicles may require 100 psi and heavier vehicles may require 2000 psi for the heavier loads.

The amount of oil included in the spring link, over and above the requisite amount described above for dampening, can be varied to change the gas volume space and achieve desired load/displacement characteristics for specific installations.

In some installations where second stage dampening is required, i.e., during movement of the bushing, its seal and the shaft as a unit between the positions shown in FIGS. 15 and 16, a supplemental dampening valve 250 may be incorporated in the cylinder 222 between the fully retracted position of the piston assembly 226 and the closed end of the cylinder. It consists of a disc shaped plate 252 mounted within the cylinder by indentations in the cylinder wall on each side of the disc. The O.D. of the disc is dimensioned to provide a close free fit within the cylinder. As shown, a rolled indentation 254 is provided in the cylinder wall at the side of the disc 252 facing the piston assembly and a plurality of circumferentially spaced-apart dimple indentations 256 are provided in the cylinder wall at the side of the disc facing the closed cylinder end. The axial spacing of the indentations 254 and 256 enables a slight axial movement of the disc 250 as a result of differential pressure across the disc caused by fluid flow during spring actuation.

When disc 252 is urged against rolled indentation 254 under the bias force of differential pressure in that direction, the periphery of the disc will engage and effectively seal against the rolled indentation, which confines all fluid flow through a metering orifice 258 in the disc 252. When disc 252 is urged in the other direction against the dimpled indentations 256 under bias force of differential pressure in that other direction sufficient space between the disc periphery and cylinder wall permits an effective free flow of fluid in that direction.

The locations of the rolled and dimpled indentations could be reversed which would reverse the respective directions of orifice controlled fluid flow and free fluid flow past the disc. Furthermore, if orifice controlled flow in both directions is required the disc could be rigidly axially fixed in the cylinder between two rolled indentations wherein the path between the disc periphery and the cylinder will be effectively sealed in both directions.

As shown, the periphery 260 of disc 252 is beveled to provide a conical seat against the rolled indentation 254, which results in a more positive sealing engagement.

In the disclosed spring link 220, the dampening during the second stage of operation is provided by hydraulic dampening. FIG. 15 shows the oil level coincident with the disc 252 at the time of contact between shaft abutment 240 and bushing extension 234. Further second stage displacement forces the higher viscosity incompressible hydraulic fluid (oil 242) past the disc in the free flow direction to the oil level shown in the fully compressed spring condition of FIG. 16.

Extension force and velocity of the extending spring shaft is controlled by the flow of oil through the orifice 258 in the valve disc 252, and prevents an undamped high velocity shaft extension during the second stage which would occur due to the higher second stage pressures and forces.

It can be visualized and should be understood, that by increasing the volume of oil so that the oil level submerges the supplemental dampening valve 250 when the shaft is fully extended, or even when the shaft has partially retracted during the first stage, one can accomplish an additional first stage dampening over and above that occurring because of the piston flow control structure. Also, if the orifice 258, were made sufficiently small, one can acquire pneumatic flow dampening during compression and/or expansion of the gas volume 244.

Using the spring link construction previously described, a multiple load path for the multiple output capability of the spring link can be accomplished by providing independent mechanical linkage connecting or abutting the bushing abutment, apart from the shaft abutment parts which are used in FIGS. 8 and 17. It is further noted that the multiple part telescoped bushing embodiment offers numerous capabilities, e.g., a universal construction can be mass-produced for economic efficiency and then during specific uses, all bushing parts can be pushed in simultaneously, providing a dual stage spring; only the inner bushing part can be pushed in and provides a dual stage spring with a reduced output force of the second stage; or the shaft abutment can be eliminated completely to provide a conventional normal output spring. Thus, one can appreciate the universal capabilities of the multiple bushing part concept.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and rage of equivalency of the claims are therefore intended to be embraced therein.

What is claimed and desired to be secured by Letters Patent is:

1. A pneumatic spring link comprising: a cylinder assembly with a closed end; a piston assembly in said cylinder with a piston shaft extending from the other end of said cylinder, bushing means on said shaft, an annular seal means around said shaft, a piston means fixed on the end of said shaft; the other end of said cylinder having means to retain said bushing means within said cylinder; said shaft seal means providing a seal against the cylinder, and a dynamic seal around said shaft; a predetermined small quantity of oil being contained in said cylinder; a predetermined accurate quantity of gas under at least several atmospheres of pressure in said cylinder; and wall means within said cylinder, at a location between the retracted position of said piston means and said closed end, fixed relative to said cylinder wall providing a partition wall dividing said cylinder into plural chambers, the chamber closest to said closed end being a fixed volume chamber; said wall means having a peripheral seal means engaging the inner surface of said cylinder and providing a seal against gas flow at least from said fixed volume chamber past the sealing engagement of said peripheral seal means into the remaining space of said cylinder; said fixed volume chamber containing a predetermined quantity of gas under greater pressure than the gas in the remaining space of said cylinder when the shaft is in a retracted condition; said annular shaft seal means and said peripheral seal means having specific gas permeability characteristics, whereby said wall means and the fixed volume chamber with gas under greater pressure provides a pressure decay compensation means aiding maintenance of desired pressure in the cylinder space occupied by said piston shaft.

2. A counterbalance assembly as defined in claim 1, wherein said annular shaft seal means and said peripheral seal means have similar gas permeability characteristics.

3. A counterbalance assembly as defined in claim 1, wherein said annular shaft seal means and said peripheral seal means have different gas permeability characteristics.

4. A method of compensating for pressure decay due to leakage of gas past and through the seal means between the shaft and cylinder of a pressurized gas spring link which includes a cylinder with a closed end; a piston assembly mounted for reciprocation in an operative chamber of said cylinder with a piston shaft extending from the other end of the cylinder, bushing means on the shaft, an annular seal means in the cylinder adjacent the bushing means and around the shaft, the piston assembly fixed on the end of the shaft; the other end of the cylinder having means to retain the bushing means within the cylinder; said annular seal means providing a seal against the cylinder, and a seal around said shaft; a predetermined quantity of oil being contained in said cylinder; and a predetermined accurate quantity of gas under at least several atmospheres of pressure in said cylinder; the method comprising: providing a supplementary fixed volume chamber with a supplementary volume of the gas, under a substantially higher pressure than the peak gas pressure which can occur in the operative chamber in the cylinder of the gas spring, with said supplementary fixed volume, chamber having a fluid flow path into the cylinder s operative chamber; providing a second seal means, in said fluid flow path, which has a material composition and configuration correlated with the configuration and material composition of the first named seal means, providing correlated characteristics which results in similar amount of leakage of the gas past and through the second seal means as is the amount of gas leakage past and through the first named seal means, to thereby replenish gas which has leaked from the operative chamber with gas from the fixed volume chamber, and to essentially maintain the desired pressure of gas in the operative chamber.

* * * * *

UNITED STATES PATENT AND TRADEMARK OFFICE
CERTIFICATE OF CORRECTION

PATENT NO.   : 4,854,554
DATED        : August 8, 1989
INVENTOR(S)  : GEORGE C. LUDWIG It is certified that error appears in the above-identified patent and that said Letters Patent is hereby corrected as shown below:

On the title page, item [54],
    line 2 of the Title, change "DIAL" to --DUAL--.

Column 1, line 2, change "DIAL" to --DUAL--.

Column 20, line 35, cancel the comma (,).
        , line 36, change "cylinder s" to --cylinder's--.

Signed and Sealed this

Twelfth Day of June, 1990

Attest:

HARRY F. MANBECK, JR.

*Attesting Officer*   *Commissioner of Patents and Trademarks*